UNITED STATES PATENT OFFICE.

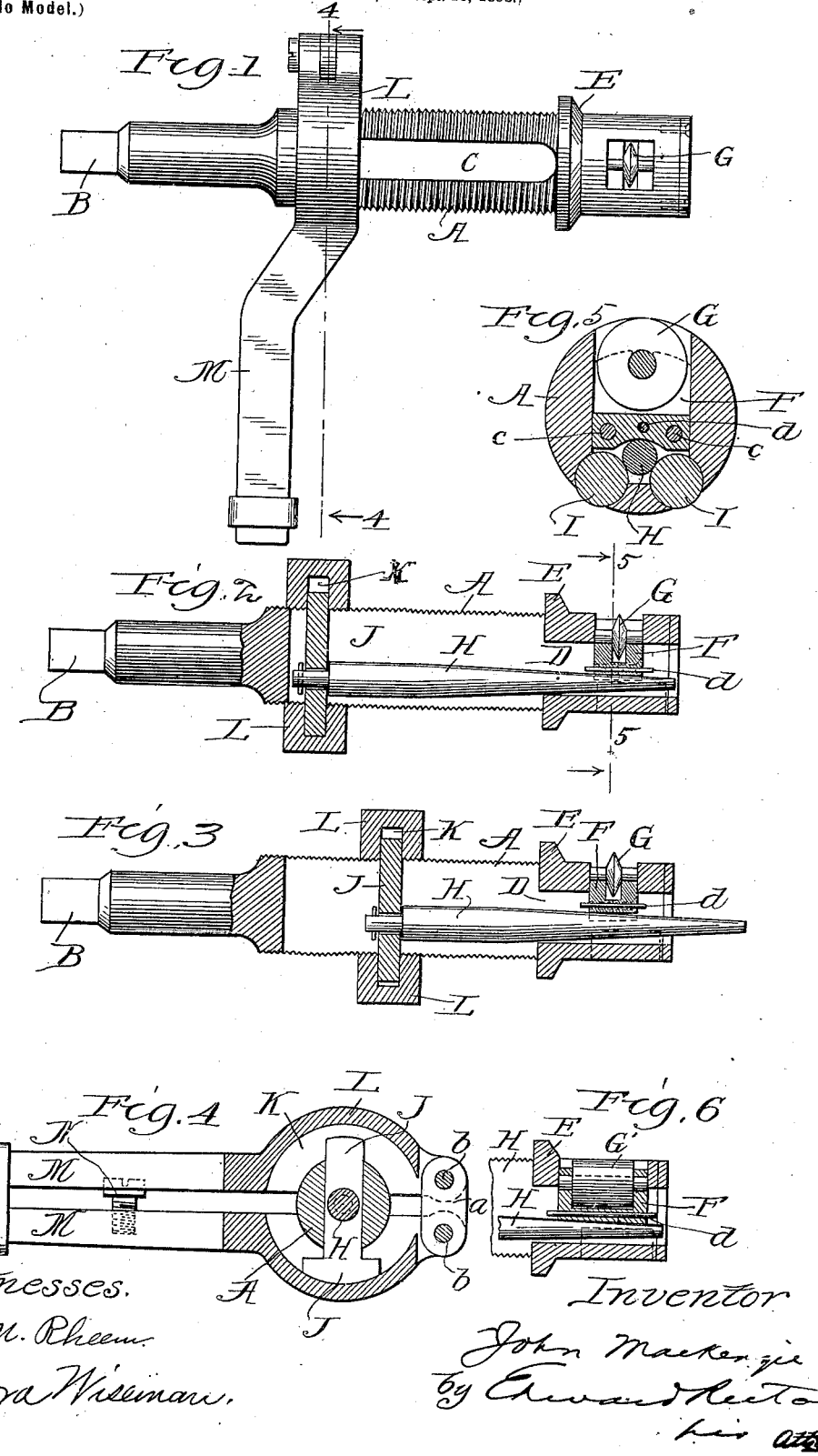

JOHN MACKENZIE, OF CLEVELAND, OHIO.

FLUE CUTTER AND ROLLER.

SPECIFICATION forming part of Letters Patent No. 672,448, dated April 23, 1901.

Application filed September 10, 1898. Serial No. 690,668. (No model.)

*To all whom it may concern:*

Be it known that I, JOHN MACKENZIE, a citizen of the United States of America, residing at Cleveland, in the county of Cuyahoga, in the State of Ohio, have invented certain new and useful Improvements in Flue Cutters and Rollers, of which the following is a description, reference being had to the accompanying drawings, forming part of this specification.

My invention relates to that class of rotary flue-cutters which are adapted to be inserted in the end of the boiler-flue and operated to cut off the tip of the flue inside the boiler; but it is also applicable to other work, and the cutting instrument may be replaced by a roller and the tool thereby adapted for rolling or expanding flues. It has for its object the provision of simple and effective means by which flue-tips may be conveniently and expeditiously cut off or rolled, as occasion may require. Its novelty will be hereinafter set forth, and particularly pointed out in the claims.

In the accompanying drawings, Figure 1 is a top plan view of the complete implement; Fig. 2, a vertical longitudinal section of the same with the cutter retracted; Fig. 3, a view corresponding to Fig. 2 with the cutter forced outward; Fig. 4, a cross-section on the line 4 4 of Fig. 1; Fig. 5, an enlarged cross-section on the line 5 5 of Fig. 2, and Fig. 6 a detail view illustrating the substitution of the roller for the cutter to adapt the implement to the work of rolling flues.

The same letters of reference are used to indicate corresponding parts in the several views.

A represents the cylindrical tool-stock, whose reduced left-hand end terminates in a shank B of rectangular or other suitable shape to fit into the socket or chuck of a suitable power-driven device by which the tool is to be driven. The middle portion of the tool-stock A is exteriorly threaded and is provided with a longitudinal slot C, which extends transversely entirely through it and at its right-hand end communicates with an approximately central bore or opening D, extending onward to the right entirely through the end of the tool. The right-hand end of the tool-stock has a smooth exterior surface, between which and its threaded middle portion is formed a projecting annular flange E. Seated in a recess formed in the front end of the tool-stock is a radially-movable cutter-block F, in which is mounted a cutting-disk G. When the block F is in its inner or withdrawn position, as in Figs. 2 and 5, the periphery of the cutting-disk G is approximately flush with the cylindrical exterior of the tool-stock or slightly withdrawn inward therefrom, while when the cutter-block is moved radially outward the periphery of the cutting-disk G is projected beyond the exterior surface of the tool-stock, as in Fig. 3.

For the purpose of forcing the cutter outward from the position shown in Fig. 2 to that shown in Fig. 3, there is provided a tapering spindle H, extending longitudinally through the tool-stock from the left-hand end of the slot C through the latter and into the bore D in the right-hand end of the tool, where the tapering end of the spindle engages the under side of the cutter-block F, as shown in Figs. 2, 3, and 5. As shown in the latter figure, the spindle H bears on its side opposite the cutter-block F (its under side in Fig. 5) upon two antifriction-rollers I I, which are suitably journaled in the tool-stock in such position that their peripheries project slightly beyond its exterior surface, so that when the end of the tool is inserted into the flue these rollers will bear against the inner surface of the flue at one side, while the cutter G bears against it at the opposite side, thus relieving the friction which would otherwise occur if the cylindrical body of the tool bore directly against the inner surface of the flue at the side opposite the cutter. These antifriction-rollers, however, are not essential, although advantageous.

For the purpose of forcing the tapered spindle H to the right as the tool is rotated by the power-driven device, thereby forcing the cutter G outward into operative contact with the inner surface of the flue, the following means is provided: At its left-hand end the tapering spindle H is connected to a transverse cross-head J, which is free to travel longitudinally through the slot C therein and whose opposite ends are confined in an internal annular groove K in a nut L, surrounding and engaging the threaded exterior of the middle portion of the tool-stock. This nut L is formed in two halves, which are hinged together at one side by a link a and pivot-screws b b, as shown in Fig. 4, (or in any other suitable manner,) and at their opposite sides are provided with projecting handles M M, adapted to be together grasped in the hand of the operator. When the two halves of the nut L are closed upon the threaded body of the tool-stock, as shown in the drawings, and the tool is rotated by the power-driven device, while the nut is held from rotation by the hand of the operator grasping the handles M M thereof, the nut will be moved along the body of the tool toward the right by the rotation of the tool, carrying with it in that direction the tapering spindle H, and thereby forcing outward the cutter-block F and cutter G. When the cutter is to be retracted preparatory to withdrawing the tool from the flue and operating upon the next flue, the nut L may be readily disengaged from the threaded body of the tool by slightly separating the handles M M, whereupon the nut may be quickly returned to its left-hand initial position, Figs. 1 and 2, thereby bringing the parts into position for the next operation.

An adjustable screw N is interposed between the handles M M for properly limiting the closing movement of the halves of the nut and preventing them too tightly engaging with the threaded body of the tool. A loop or clip O is also provided, to be slipped over the ends of the handles M M when the two halves of the nut are in closed position, as a convenient means for holding them engaged with the threaded body of the tool; but this may be done in other ways or solely by the hand of the operator.

From the foregoing description it will be understood that in using my novel tool its right-hand end will be inserted in the end of the flue whose tip is to be severed until the projecting flange E abuts against the end of the flue and will be held in that position while being rapidly rotated by the power-driven device, the operator holding the handles M M of the nut in his hand so that the nut will be moved to the right along the tool as the latter rotates and the spindle H thereby caused to force the cutter outward into engagement with the inner surface of the flue, the cutter acting upon the latter along a single line circumferentially of the flue. When the cutter has been forced outward far enough to sever the tip of the flue, the rotation of the tool will be stopped and the two halves of the nut spread apart and disengaged from the body of the tool and the nut and spindle H moved backward along the tool to the left-hand position and the nut reëngaged therewith, whereupon the end of the tool will be withdrawn from the flue which it had been operating upon and inserted into the end of the next flue and the same operation repeated.

As stated at the beginning of the specification, my novel tool may be employed either as a flue-cutter or a flue-roller, its employment as one or the other at will requiring merely the substitution of a roller for the cutting-disk G, or vice versa. In Fig. 6 such a roller G' is shown substituted for the cutter G. In this view the block F which carries the roller G' is shown considerably longer than the block F in Figs. 2 and 3 to accommodate the greater length of the roller; but where it is intended that the same tool shall be provided for the substitution of the roller for the cutter, and vice versa, the cutter-block of Figs. 2 and 3 will be made as long as the block in Fig. 6, so that they will fit the same recess in the tool, as will be readily understood.

The cutter-block or roller-block F may either be made of two halves secured together by screws c c, as in Figs. 2, 3, and 5, in which case the cutting disk or roller may be provided with integral projecting trunnions or journals, or the block may be made of a single solid piece, as in Fig. 6, in which event the cutting disk or roller will be provided with a central bore and mounted upon a separate spindle passed through it and supported in a block. In each case there is shown a pin d passed longitudinally through the lower end of the block and projecting beyond its ends for the purpose of preventing the block slipping entirely out of its seat in the tool.

Having thus fully described my invention, I claim—

1. A tool of the character described, comprising a rotary tool-stock adapted to abut and turn against the end of the flue, a radially-movable block mounted therein and carrying the working tool, a tapered spindle movable longitudinally of the tool-stock for forcing said block outward, and a two-part nut threaded upon the tool-stock and connected with said spindle, said nut being advanced upon the tool-stock by the rotation of the latter in one direction and serving thereby to advance the tapered spindle and force outward the working tool, and being also adapted to have its two halves separated and disengaged from the tool-stock to permit the nut to be moved toward the rear end of the tool-stock and retract the tapered spindle, for the purpose described.

2. The herein-described tool, comprising the body A having the exteriorly-threaded middle portion and provided with the slot C and flange E, the radially-movable block F seated in a recess in said body and carrying the working tool, the tapering spindle H coöperating with the block F, the two-part nut L engaging the threaded body A and having its two halves hinged together at one side and provided at their opposite sides with the projecting handles M M, the adjustable stop-screw N interposed between the handles M M, and the cross-head J extending transversely through the slot C in the body A and engaging the internal groove K in the nut L, and connected with the tapering spindle H, for the purpose described.

3. The herein-described tool, comprising the body A having the exteriorly-threaded middle portion and provided with the slot C and flange E, the radially-movable block F seated in a recess in said body and carrying the working tool, the antifriction-rollers I I journaled in the body A opposite the block F, the longitudinally-movable tapering spindle H having its end projecting between the block F and rollers I I, the two-part nut L engaging the threaded portion of the body A and provided with the internal groove K, and the crosshead J extending through the slot C in the body A and engaging the groove K, and connected with the tapering spindle H, for the purpose described.

JOHN MACKENZIE.

Witnesses:
 JOHN H. NICHOLS,
 GEO. W. GLICK.